US007987002B2

(12) United States Patent
Fredriksson

(10) Patent No.: US 7,987,002 B2
(45) Date of Patent: Jul. 26, 2011

(54) ARRANGEMENT FOR DISTRIBUTED MEASUREMENT SYSTEM FOR MEASUREMENT AND SIMULATION IN DISTRIBUTED CONTROL SYSTEMS

(75) Inventor: Lars-Berno Fredriksson, Kinna (SE)

(73) Assignee: Xinshu Management, L.L.C., Dover, DE (US)

( * ) Notice: Subject to any disclaimer, the term of this patent is extended or adjusted under 35 U.S.C. 154(b) by 1035 days.

(21) Appl. No.: 11/420,684

(22) Filed: May 26, 2006

(65) Prior Publication Data
US 2006/0241784 A1    Oct. 26, 2006

Related U.S. Application Data

(63) Continuation of application No. PCT/SE2004/001540, filed on Oct. 25, 2004.

(30) Foreign Application Priority Data

Nov. 26, 2003  (SE) ...................................... 0303138

(51) Int. Cl.
 *G05B 15/02*     (2006.01)
(52) U.S. Cl. ........................................... 700/9
(58) Field of Classification Search .................. 700/275, 700/276, 277, 278, 299, 300, 9
See application file for complete search history.

(56) References Cited

U.S. PATENT DOCUMENTS 5,490,065 A * 2/1996 Hoenninger et al. ........... 701/29
5,530,643 A   6/1996 Hodorowski
5,634,039 A   5/1997 Simon et al.

(Continued)

FOREIGN PATENT DOCUMENTS
DE    4325860    2/1994
(Continued)

OTHER PUBLICATIONS
"GSM"; Apr. 22, 2010; Wikipedia; pp. 1-2.*
(Continued)

Primary Examiner — Albert Decady
Assistant Examiner — Chad Rapp
(74) Attorney, Agent, or Firm — Fitch, Even, Tabin & Flannery

(57) ABSTRACT

A first unit (200, 303, 304) works with analog and digital signals in physical sequences referring to one or several measurement objects (200', 305, 307), which work with one or several functions (200", 211, 302, 308, 309) and detectors (201, 202, 205) and/or control devices (212/214) detecting these functions. A distributed control system (206) works with a first protocol (218). The first unit (200) is connected to the control system (206) and is arranged, through its compatibility with the first protocol (218), to receive and/or send messages from/to the control system. The first unit (200) receives and sends physical signals for measurement and/or control of various types and combinations of functions and/or detectors or control devices, and processes the physical signals. The first unit is connected to a second connection (209) working with a second protocol (418). The second connection is in a link in a tool arrangement. The first unit communicates with a second unit (450 and/or 201, 221) via the second connection (209). The first unit van be set up via a connection that works with the first and/or the second protocol(s) or variant(s) thereof. In this way, more complex and simpler tasks can be dealt with separately, and can be divided up between different pieces of equipment and different people.

29 Claims, 7 Drawing Sheets

U.S. PATENT DOCUMENTS

| | | | |
|---|---|---|---|
| 6,009,363 | A | 12/1999 | Beckert et al. |
| 6,067,612 | A | 5/2000 | Sasaki et al. |
| 6,167,464 | A * | 12/2000 | Kretschmann ............... 710/15 |
| 6,199,018 | B1 | 3/2001 | Quist et al. |
| 6,473,656 | B1 | 10/2002 | Langels et al. |
| 6,493,743 | B2 | 12/2002 | Suzuki et al. |
| 6,510,353 | B1 | 1/2003 | Gudaz et al. |
| 6,747,366 | B2 | 6/2004 | Juntunen |
| 7,143,149 | B2 * | 11/2006 | Oberg et al. ............... 709/220 |
| 7,149,206 | B2 | 12/2006 | Pruzan |
| 7,319,925 | B2 * | 1/2008 | Gisy et al. ............... 701/29 |
| 7,650,425 | B2 * | 1/2010 | Davis et al. ............... 709/238 |
| 2001/0016849 | A1 | 8/2001 | Squibbs |
| 2002/0007391 | A1 | 1/2002 | Suzuki |
| 2002/0122583 | A1 | 9/2002 | Thompson |
| 2004/0101412 | A1 | 5/2004 | Kallman et al. |
| 2004/0236885 | A1 | 11/2004 | Fredriksson et al. |
| 2005/0075351 | A1 | 4/2005 | Berg |
| 2006/0069939 | A1 | 3/2006 | Fredriksson et al. |
| 2006/0122730 | A1 * | 6/2006 | Niemela et al. ............... 700/245 |
| 2007/0013572 | A1 | 1/2007 | Fredriksson |

FOREIGN PATENT DOCUMENTS

| | | |
|---|---|---|
| DE | 19636425 C1 * | 11/1997 |
| DE | 101 28 754 A1 | 12/2002 |
| DE | 10128754 | 12/2002 |
| DE | 102 36 540 A1 | 2/2003 |
| DE | 10236540 | 2/2003 |
| EP | 0718727 | 6/1996 |
| EP | 0890906 | 1/1999 |
| EP | 1 197 396 A2 | 4/2002 |
| EP | 1197396 | 4/2002 |
| FR | 2 812 437 A1 | 2/2002 |
| FR | 2812437 | 2/2002 |
| WO | 98/33129 A1 | 7/1998 |
| WO | WO-9833129 | 7/1998 |
| WO | 02/100041 A1 | 12/2002 |
| WO | WO-02100041 | 12/2002 |
| WO | WO-2004015945 | 2/2004 |

OTHER PUBLICATIONS

Fredriksson, L.B., "Bluetooth in Automotive Applications", Kvaser AB, Sweden, May 2, 2001, pp. 1-6.

Lars-Berno Fredriksson, "Bluetooth™ in Automotive Diagnostics," Kvaser AB, Sweden, May 2, 2001, 7 pages.

PCT International Preliminary Report on Patentability and Written Opinion of the International Searching Authority for International Application PCT/SE2004/001540 dated May 29, 2006, 11 pages.

EP Patent Office Communication for EP Appln. No. 04 793 841.0-2416 dated Jul. 29, 2010.

PCT International Search Report for PCT/SE2004/001732, date Jun. 28, 2005.

* cited by examiner

ARRANGEMENT FOR DISTRIBUTED MEASUREMENT SYSTEM FOR MEASUREMENT AND SIMULATION IN DISTRIBUTED CONTROL SYSTEMS

CROSS REFERENCE TO RELATED APPLICATIONS

This Application is a Continuation under 35 U.S.C. §120 of International Application PCT/SE04/001540 filed on Oct. 25, 2004. Application PCT/SE04/001540 claims priority to Swedish Application 0303138-2 filed on Nov. 26, 2003. The entire contents of each of these applications is incorporated herein by reference.

Further, this application is related to International Application PCT/SE2003/01219 filed on Jul. 16, 2003, and published on Feb. 19, 2004 as WO 2004/015945 A1. The entire contents of related application PCT/SE2003/01219 are incorporated herein by reference.

BACKGROUND

The present disclosure relates to an arrangement for measuring analog and digital signals emanating from sensors arranged on measurement objects that are included in one or several distributed control systems, analyzing measurement results and/or controlling and/or monitoring functions and/or structures in a distributed control system that works with a first protocol.

The analysis and monitoring is already known of functions in distributed systems, for example control systems for machines, vehicles, for example cars, processes, etc., of the type that are described in patent applications and patents submitted and granted to the same applicant and/or inventor as the present patent application. For example, reference is made in particular to PCT/SE2003/01219, as this disclosure can be considered to be a further development of that previous work.

Reference is also made to the fact that measurement of analog signals and collection of measurement data is carried out and analyzed by special measurement personnel using traditional measurement data collection systems and evaluation programs. This work is separate from the analysis of the communication in the control system. The measurement of the measurement object is usually carried out in an independent environment.

As an example, the measurement of a car's motor and associated equipment in a test cell can be mentioned.

There is also a need for an arrangement where the functions relating to measurement, control, tools, simulation and protocols can be allocated to different specialists in the respective fields, with the result that the construction of the measurement device, control device, tool and protocol can be kept separate and that a developer does not need to have a thorough knowledge of the specialized field of other developers and that tools and instruments for special problems can be constructed in a simple way by combining the various functions.

There is also a need in connection with various subsystems of this kind to have an arrangement for reliable and accurate indication of time, on which functions in tools, instruments and subsystems are to be based.

There is also be need to be able to divide processor-intensive and memory-intensive tasks relating to calculation, control, measurement, data collection, and analysis between the various components involved in an optimal way (compare the use of PCs, PDAs, etc.) It also advantageous in certain situations to be able to utilize unit(s) in or with different functions in the different function stages.

SUMMARY

The object of the present invention is, among other things, to solve the problems discussed above and to propose an arrangement that essentially simplifies the work relating to measurement, control, analysis and monitoring and achieves a practical distribution of the functions relating to measurement, control, data collection, tools, simulation, and protocols.

The principal characteristic of the new arrangement is, among other things, that a first unit is connected or can be connected to the control system, which unit, as result of its compatibility with a first protocol, obtains and/or provides information about the functions and/or structures and that the said first unit comprises a unit with inputs for analog and digital measurement signals and outputs for analog and digital output signals, and that the said first unit comprises or is connected to a second unit and transforms at least those parts in the first protocol that concern information about the functions and/or structures to a second protocol, by means of which the said information can be initiated and/or processed in a tool arrangement comprised in or connected to the second unit, which tool arrangement is arranged to work with the second protocol. In this way, first readings and/or changes in the first protocol on account of the analysis and/or the monitoring can be implemented by means of second readings and/or changes in the second protocol. The more concrete characteristics of the invention are apparent from the characterizing part of claim 1.

By means of what is proposed above, the problems described in the introduction can be solved.

The tool arrangement or the basic unit can work with information stacks in several layers and is intended to make possible measurements, controls, analysis and/or monitoring of one or several distributed control systems. A complete tool/measurement/control/analysis arrangement stack can logically be divided in general into the following functions:
1. Graphical display function
2. Input/output data function
3. Measurement function
4. Control function
5. Analysis/Simulation/Processing function
6. Database function
7. Protocol function
8. Network connection function.

For very simple protocols, all the functions except 3 and 4 can be carried out within a PC, but usually the functions 7 and 8 are allocated to one or two units that are specially developed for the network protocol that is used in the network that is to be analyzed. The communication between the PC and the special protocol unit is carried out using any protocol and connection that is standardized for general exchange of data between the PC and its peripherals, for example PCMCIA, V24, USB, etc. This communication only transfers data and the characteristics of the utilized protocol are not used as the basis for the analysis/processing work or for the characteristics of the database. The measurement function and the control function are usually separated, particularly during the development work. When the development work has been completed, the measurement functions are reduced as much as possible and combined in a control unit, for example for motor control or gearbox control, that is connected to the distributed control system.

In order to solve the abovementioned problems, the architecture is expanded as follows for a first network protocol (that can be generic or special) to which the following are connected, adapted for a second protocol:
1. Gateway function
2. Measurement/Control/Analysis/Processing function
3. Database interface function
4. Protocol function
5. Network connection function.

Thus two or more units can be connected consecutively in series between the tool and the control system, with one of the units being connected directly or via an additional unit or units to the target system (the control system). The tool arrangement can be arranged so that first units are arranged to handle information in an upper layer in the stack, that is general information, while the said second unit is arranged to handle information in a layer beneath the upper layer in the stack, that is information of a special nature for the target system. The other units can be arranged to handle information in a layer below the last-mentioned layer in the stack. The tool arrangement can be arranged to work with a protocol allocated to it, and information about differences between the functions related to information in the stack associated with the unit connected to the control system and the control system's actual functions can be transferred to the tool arrangement for reading or controlling the information by means of the allocated protocol. A gateway function or protocol converter can transform information in a protocol utilized by the control system to information in the allocated protocol, or vice versa. The gateway unit can be connected to the PC or the PDA via a standard protocol, for example USB, and can also be connected to other units connected to the system via a variant of the same standard protocol enhanced with a time-synchronization function that enables all the units connected to the gateway to work with or in relation to a common time base.

BRIEF DESCRIPTION OF THE DRAWINGS

A currently-proposed embodiment that has the significant characteristics of the invention will be described below with reference to the attached drawings in which.

DETAILED DESCRIPTION

Figure 1:
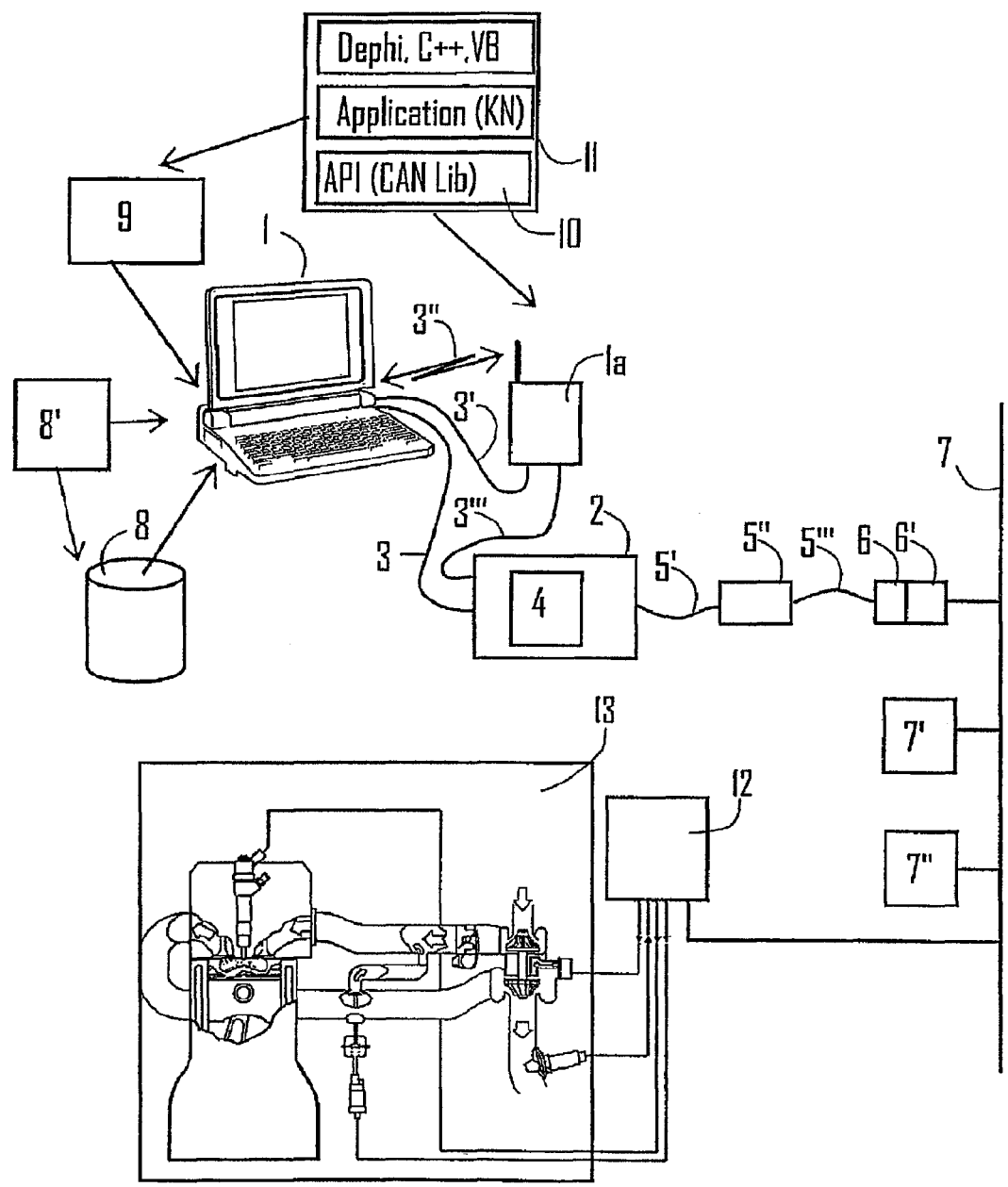
FIG. 1 shows in block diagram form and in outline, the connection of the tools and units to the control system and a measurement system.

The tool or the tool arrangement consists of a number of modules or units that are shown schematically in FIG. 1, where the unit 1, the basic unit, comprises a unit suitable for communication with people and with associated equipment, for example a PC or PDA of conventional type. In an embodiment, a unit 2 is connected to the unit 1, which unit 2 consists of a PC interface. The connection is carried out via a connection 3 which can be of a currently-available type for connecting peripherals to a PC, for example USB, FireWire, PCM-CIA, PCI, Bluetooth, etc. The unit 2 comprises a microprocessor with the requisite peripherals, symbolized by 4, and a bus module that comprises a first cable part 5', a bus adapter unit 5" and a second cable part 5''' that terminates in a connector 6 by which it is connected to the system bus 7 via the connector 6' attached to the bus.

System modules connected to the system are symbolized by 7' and 7" and 12. The basic unit 1 contains a database 8 which is suitable for the purpose, an application 9 working with the database, and an application interface (API) 10 working with the unit 2. Using the database editor 8', the user can edit the database and specify how the values in this are to be interpreted and represented on the display screen in the tool. The entry of interpretation data can be carried out directly from the PC's keyboard or from a configuration file.

An example of a database editor is "Navigator Database Editor" from Kvaser AB, Sweden. The application is written in a commonly-used language, for example Delphi, C++ or Visual Basic. An example of an application is Kvaser Navigator and an example of an API is CANlib from Kvaser AB. The construction is shown schematically by 11. An example of the unit 2 is LAPcan II and a unit 5" consists of DRVcan 251, these also available from Kvaser AB.

Using the described arrangement and exemplified products, the system 7 can be analyzed and can work with the protocol CAN and a physical interface according to the specification for, PHILLIPS CANdriver 82C251. A unit in the system 7 can be a motor control unit 12, for example BOSCH Di-Motronic, which controls the motor 13. A modern PC has sufficient processing power and memory to hold a complex database and to carry out processor-intensive calculation and analysis tasks. In this respect, a PDA is more limited, for which reason it can be expedient to allocate processor-intensive and memory-intensive tasks to the unit 2 and/or reduce the capacity of the tool in a PDA version. This can, for example, be carried out by utilizing the PC version as a "programming tool" for the PDA version. Special measurement and analysis arrangements and parts of the database necessary for these and one or several fixed display arrangements of measurement and analysis results on the screen of the PDA.

After it has been determined in the PC which tasks are to be resolved and how the results are to be displayed, a configuration file is generated which is then downloaded to the PDA. The configuration can be carried out in steps, for example with a separate configuration of the display function, another for the database function, and so on. The unit 2 according to FIG. 1 can thus alternatively consist of a PDA unit 1a with connections 3', 3" and 3''' to the tool part 1 (3'=fixed and 3"=wireless) and the unit 2 respectively, which, as described below, can form a first unit, with the PDA unit being considered to be comprised in a tool arrangement with the unit 1.

Figure 2:
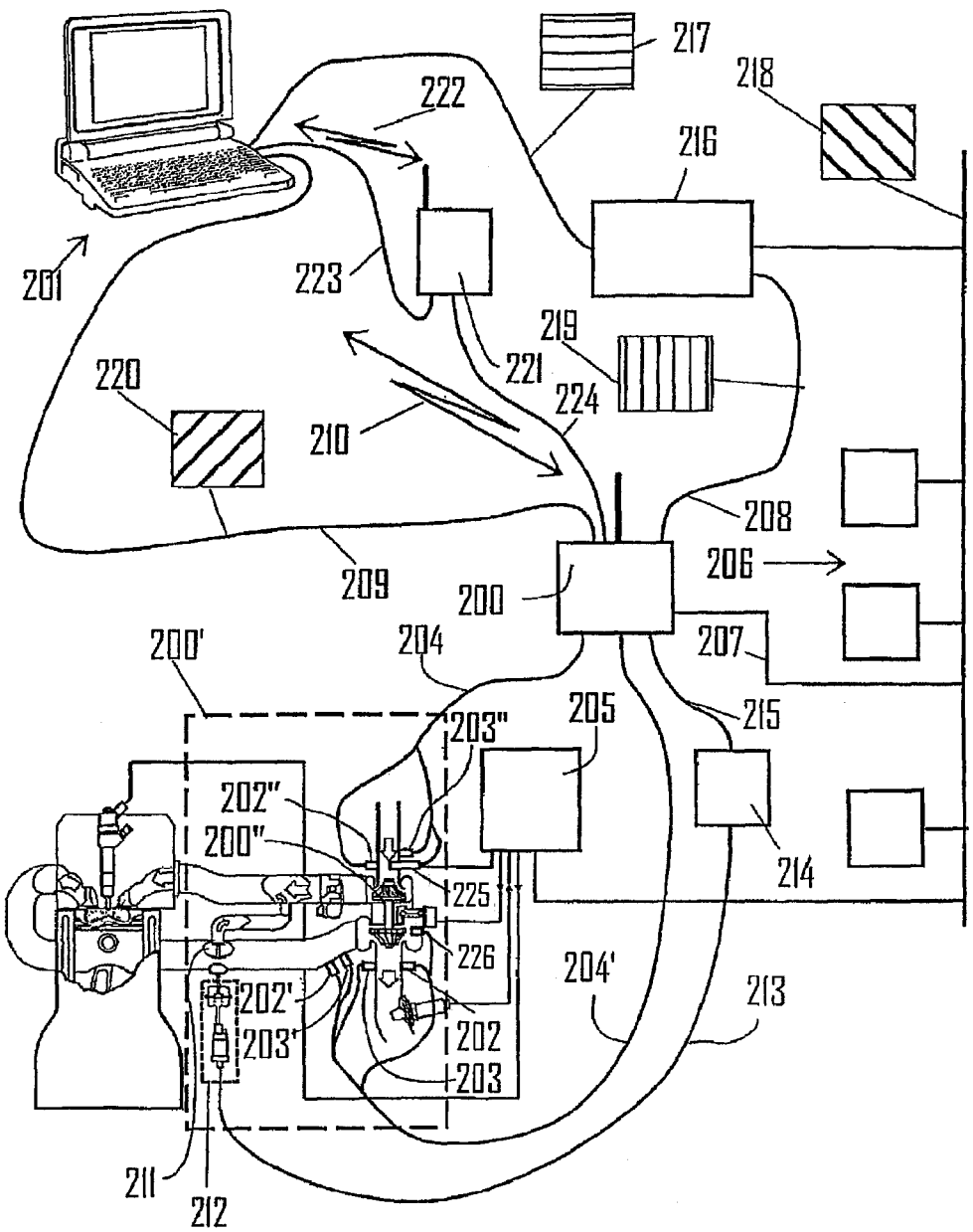
FIG. 2 shows in block diagram form and in outline, parts of FIG. 1 supplemented with additional parts.

A solution according to the invention is shown in FIG. 2. A measurement module 200 is introduced here for measuring the turbo unit 200'. A number of detectors are connected to this by cabling 204 and 204', such as sensors of various kinds, for example a velocity sensor 226, a number of pressure sensors 202, 202', 202", and a number of temperature sensors 203, 203' and 203" and a flow meter 225, for measuring the speed of the compressor/turbine unit 200''', incoming and outgoing pressure and temperature, ingoing flow, etc., using which the characteristics of the turbo (the measurement object) can be calculated. The measurement module 200 filters, collects, time-stamps and processes the measurement signals in a suitable way and places them in a local database, all in accordance with the rules of the database.

Supplementary measurements that are carried out by the motor control unit 205 can be read from the CAN bus system 206 via the connection 207, either by listening to the CAN bus for messages with measurement values that the motor control module normally transmits, or in response to a request from the measurement module. The request can be carried out according to CCP (CAN Calibration Protocol). The measurement module then sends the measurement results to the PC for further processing. The measurement results can be sent either via the CAN bus in the system 206, via the exclusive CAN connection 208, via the USB connection 209 or via the Bluetooth connection 210. The character and arrangement of the measurements determine which path is suitable for the transmission of the measurement values. For more complex measurements in a test cell, it can be appropriate to have a dedicated PC for the measurement value analysis and to have transmission via USB, while in a test car it is possible to carry out simpler measurements and to transmit measurement values to a PDA via the car's ordinary CAN bus.

In certain cases, it can be appropriate to let the measurement module be a control device and to let the measurement module carry out control of functions carried out by control devices such as stepping devices, electric motors, etc. FIG. 2 shows how the waste gate valve 211 is controlled by the stepping device 212 which is connected to the amplifier unit 214 by the connection 213. The amplifier unit obtains an analog or digital control signal from the measurement unit 200 via the connection 215. The measurement unit obtains the control commands from the PC which are converted to a control signal which is amplified by the amplifier 214, the output signal from which is converted to an opening position of the valve 211 which is effected by the stepping device 212. As an alternative to the PC 201 giving control commands, a regulating algorithm can be inserted in the measurement unit 200, so that the valve position is controlled by feedback from appropriate measurement signals.

The tool according to FIG. 2 thus consists of a basic unit 201 and a unit 216 that converts the low-level protocol, for example CAN, of the measurement system 206 to a standard protocol for PC, for example PCMCIA or USB as described above. A unit 200 is connected to the unit 216, which unit 200 is connected in turn to the system 206 and to the sensors on the measurement object 200'. The communication between the unit 201 and the unit 216 is carried out using a first protocol symbolized by 217, communication between the unit 216 and the system 206 is carried out using a second system protocol 218, and communication between the unit 216 and the unit 200 is carried out using a third protocol symbolized by 219. The communication between the unit 200 and 201 is carried out using a fourth protocol 220.

The term protocol means here a basic protocol including bit transmission plus higher layers. These layers are not the same as those of the currently-used Open System Interconnections Reference Model (OSI model). Many tasks that, according to the OSI model, are handled by the lower layers, can be carried out by higher layers. For example, the protocol 217 can be based on PCMCIA supplemented by API functions that are tailor-made for a particular unit 216 and the protocol 220 can be based on a suitable variant of USB, for example USB High-speed, USB Fullspeed or USB Low-speed, supplemented by API functions that are tailor-made for the unit 200. By variant of a protocol is thus meant such larger or smaller changes. These modifications can be completely defined or can be modified by a modifying protocol.

As a comparison, J1939 can be mentioned as an example of a completely-defined protocol based on the basic protocol CAN and CanKingdom can be mentioned as an example of a protocol that can be modified and that is also based on CAN, using which a final protocol can be defined in detail. Corresponding principles can be applied for general basic protocols such as USB, TCP/IP, etc, in order to obtain suitable protocols for communication between the tool and its interface with the target system.

There can be additional protocols, specially adapted to be used in a configuration or start-up phase. The tools known to date have limitations caused by their architecture. To date, systems have been constructed using the approach that the communication protocol is a part that is as independent of the applications of possible. As the description shows, the invention operates with several protocols, also including APIs and with details in the communication protocol such as bit transmission being modified to suit the applications and with the structure and rules of the database being common regardless of which basic protocol is used for the communication. The data structures of the system protocol are used throughout. For example, if the system protocol is J1939, PGAs and SPNs are used in accordance with J1939-71, even if the communication protocol is USB or Bluetooth.

For analysis of events and measurements in systems of the type described, it is important to be able to relate these temporally. In the solution according to this disclosure that is shown in FIG. 2, this can be carried out in a simple way for the measurements carried out by the unit 200 using a clock function in this unit. Measurement values from 205 can be roughly related to the measurement values in 200 by time-stamping in the unit 200 suitably-selected messages received from the system 206. Some of these selected messages can contain measurement values or events that are transmitted as standard in the system 206. The quality depends, however, upon how well the time delay between the measurement and the transmission of the respective measurement signal in the system 206 is known.

An alternative is to connect the units 200 and 205 to one and the same sensor, for example the flow meter 225. The measurement signals from the two units can be related to each other temporally in the PC 201 by correlating the flow values between the respective units, as they are based on a common sensor. The tool arrangement can comprise a complex part 201 and a less complex part (PDA) 221. The connections 209, 222, 223, 224, are arranged in a corresponding way to 3, 3', 3" and 3'".

In the example above, it has been assumed that the turbo system only contains one turbo. Today, however, the trend is towards more complex double or triple systems in which any turbo can be electrically-assisted or driven completely by electricity. Several such solutions are described in the technical literature, for example articles issued by 3K-Warner Turbosystems GmbH in the series Academy ("Regulated Two-Stage Turbocharging-3K-Warner's New Charging System for Commercial Diesel Engines" by graduate engineer Frank Pflüger, "Der eBooster" by Dr. S. Münz et. al. and "Moderne Aufladekonzepte für PKW—Dieselmotoren" by P. Hoecker et. al.).

Figure 3:
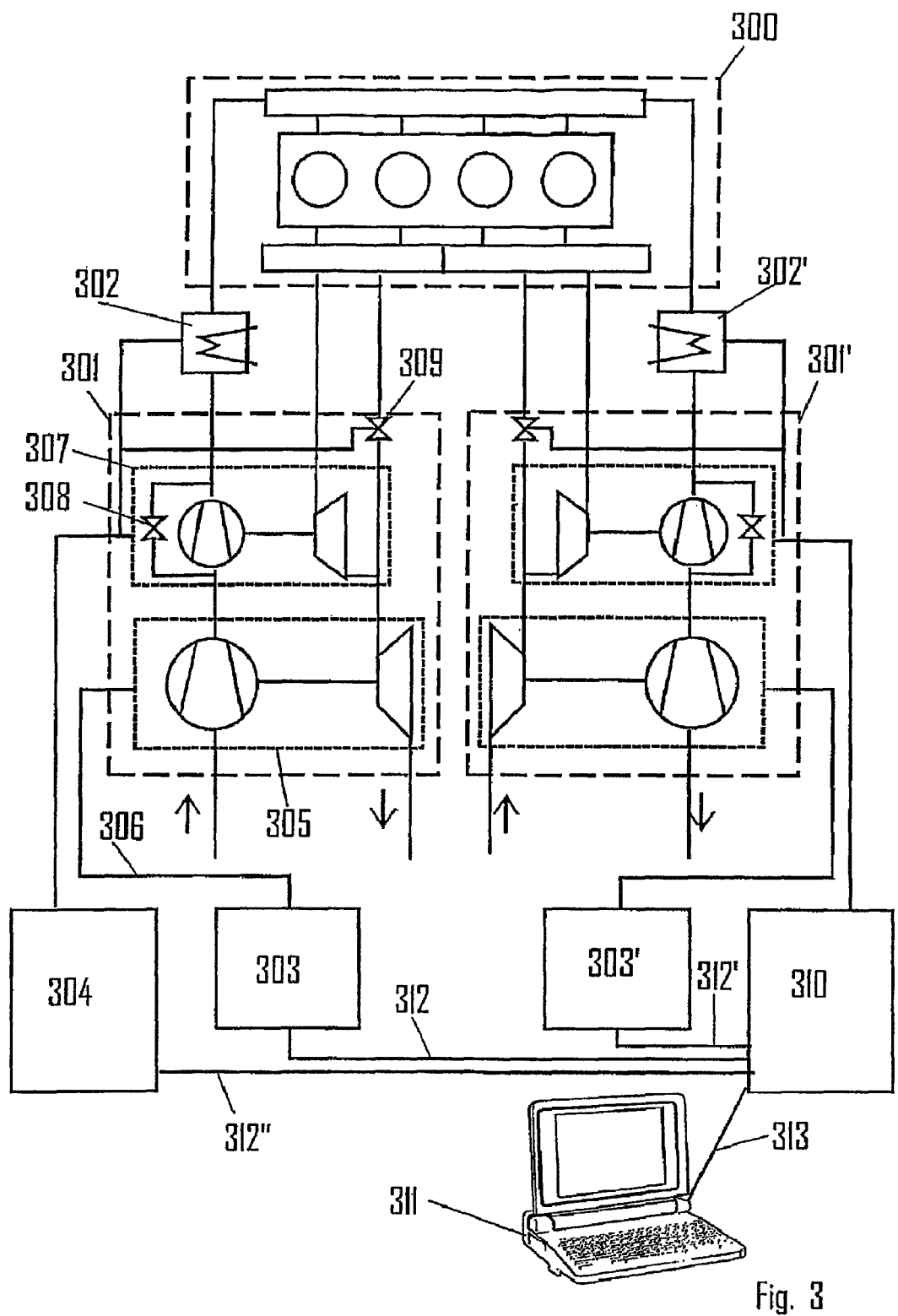
FIG. 3 shows in block diagram form, a measurement arrangement for a turbo unit as an example of the measurement part of the invention.

Such systems require considerably more measurements than a measurement unit 200 can carry out. The solution to this problem is to connect together several measurement units to one or several shared buses. Each measurement unit measures and, if required, also regulates one turbo in the multi-turbo system. The clocks in each measurement unit are synchronized or set in relation to each other via one of the buses so that a common time base is obtained which can be used to coordinate measurement values and required values temporally. An embodiment of a distributed measurement system with the units 303,303', 304 and 310 is shown in FIG. 3.

Two identical two-stage turbo units 301 and 301' that supply the motor with compressed air via the coolers 302 and 302', are connected to a combustion motor 300. There are two types of measurement module. A simple measurement module, 303, with a measuring part, a processor, a CAN bus connection and a USB connection. Such a unit can perform measurement and regulating tasks for one turbo. The more complex unit 304 has, in addition, also an additional processor with several network connections, for example Bluetooth connection, USB connections, or several CAN connections or combinations of these, using which a measurement system network can be constructed from a complex unit together with one or several simple and/or complex units. The simpler unit 303 is connected to the low-pressure turbo 305 via connecting cabling 306 which, in turn, is connected to requisite sensors for carrying out the measurement as shown in the examples above. The unit 304 is connected to the high-pressure turbo 307 and also to the intercooler 302 for measurements. In addition, it regulates the bypass valve 308 and the exhaust gas distributing valve 309. In the same way, the identical turbo system 301' is connected to the measurement units 303' and 310.

The measurement module 310 is of the same type as 304, but has here, in addition, an interconnecting function between the various measurement modules and the PC 311. USB has been selected as the common message transmission protocol. The measurement module 310 is connected to the measurement modules 303, 303' and 304 by the connections 312, 312' and 312" respectively and to the PC 311 by the connection 313. In its simplest form, 310 has the function of a USB hub and compiling of the measurement values for analysis is then carried out by the PC 311. The measurement system's USB network differs from a standard network in that the USB protocol between the measurement units has an additional feature, by means of which a common time is obtained in the measurement system.

The measurement module 310 has, however, the capacity to execute complex programs that take some of the load off the PC 311. This is particularly valuable if the PC 311 is replaced by a unit with lower performance, for example a PDA, or if the system is to be used for independent compiling of measurement values where all the calculation can be carried out by the units involved and stored in the memories of the complex measurement units. General modules of the type 303 and 304 can thus be modified in the simple way by means of instructions for special tasks and measurement configurations which are thereby standardized, which simplifies both the taking of the measurements and the interpretation of the measurement results.

Many small measurement systems are connected together and form larger systems. As a result of the simplicity of the small systems, engineers with the task of creating models of machines who have expertise in simulation but limited knowledge of taking measurements, are able to set up the measurement arrangements so that they provide information about the quality of the simulation models in an optimal way. The measurement arrangements for subsystems can thus be integrated into larger measurement arrangements with other objectives in a simple way and without causing interference. In this way, measurements for completely different tasks can be utilized for verifying models. For example, a measurement for providing information about a motor's cooling system or electrical system can be utilized for verifying models of the turbo system.

Figure 4:
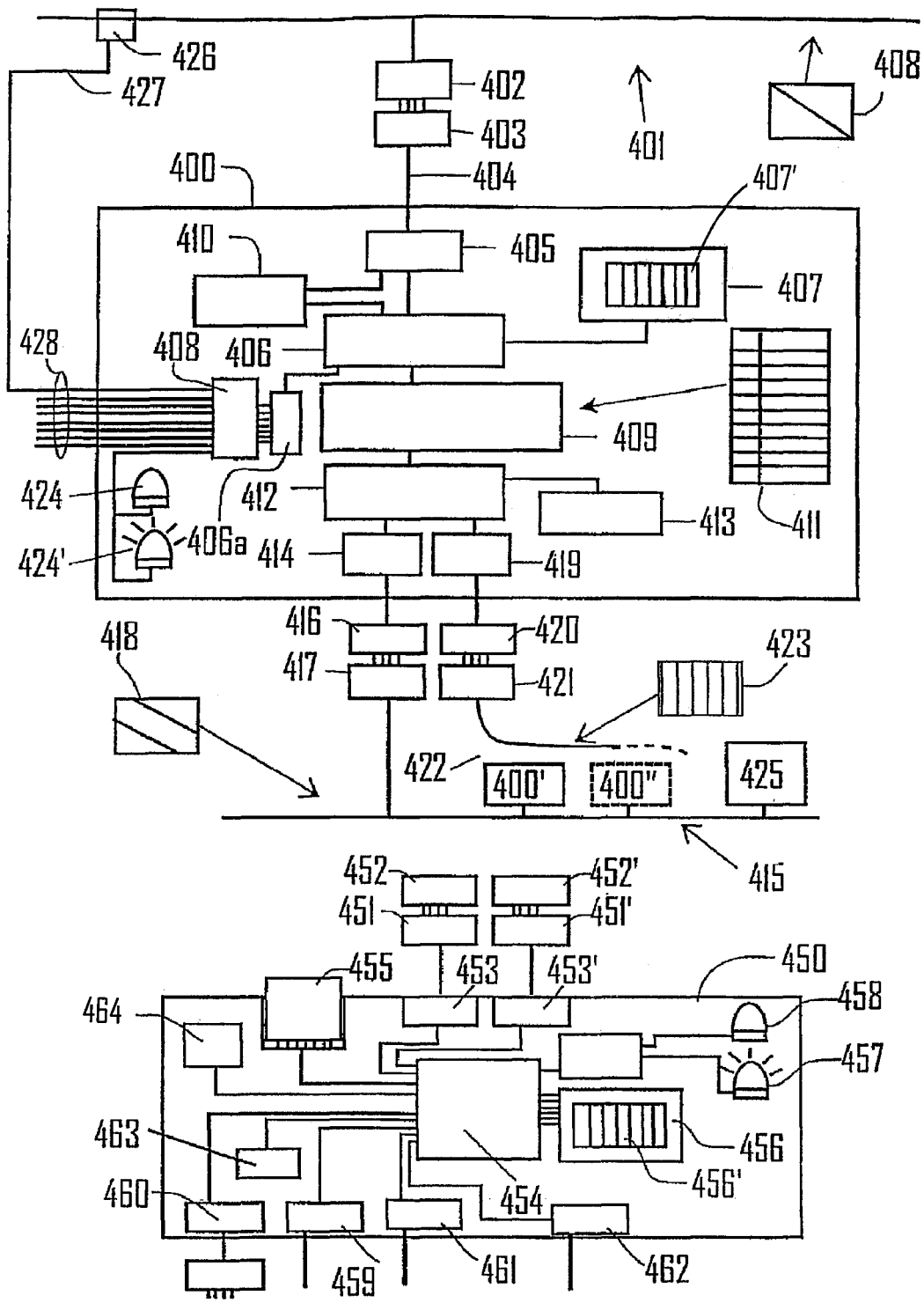
FIG. 4 shows in block diagram form, a construction of the first and the second unit

FIG. 4 shows schematically the construction of a unit 303 according to FIG. 3, here designated 400. For the sake of clarity, it is provided with two microprocessors, but the task can be carried out using one microprocessor. The unit 400 is connected on one side to a system 401 via the connections 402,403 and the connection lead 404. The signals on the bus can be read by the microprocessor 406 via the adapter electronics 405.

By means of instructions stored in the memory 407, the signals can be interpreted in accordance with the protocol 408 utilized in the system. In its simplest form, the interpretation can involve only the transference of the received bit pattern, but the interpretation can be of an extensive type where much additional information specified by the protocol's rules is supplied by the microprocessor. Application software, that is instructions for one or several applications that process information available to the microprocessor, is also stored in the memory 407, symbolized by 407'. The information interpreted in this way is transferred to the two-port memory 409. Additional information of interest can be added to the interpreted information, for example time-stamping when the information was received from the system. The time is obtained from the clock 410 which is triggered in a suitable way by the adapter electronics, for example at the start of the reception of a message.

The information is stored in the two-port memory in an organized way according to rules modified in accordance with the requirements of the system protocol, so that specific information is stored in a specific location indicated by the table 411. The two-port memory 409 can be read by the microprocessor 412 that can communicate according to a second protocol using rules stored in the memory 413 and can communicate physically with a second system 415 via the adapter electronics 414 via the contacts 416 and 417. Rules are also stored in the memory 413 for how the information stored in the two-port memory 409 according to the rules in 407' and 411 is converted according to rules for the second protocol 418.

In simpler systems, the second protocol can be based on CAN and several units 400', 400", etc, of the type 400, and can connect a unit 425 of the type 201 or 221 in the way described above. The second protocol is thus modified for communication between units comprised in a measurement system or analysis system. In this way, a separate measurement system and/or analysis system can be created in simple way, in which data, information and commands are exchanged using a protocol that is common to the system and that is independent of the target system's protocol.

The unit 400 contains a part in the microprocessor arrangement 406, shown as 406*a* (I/O), that works with digital and/or analog functions. The part 406*a* comprises inputs and/or outputs to the multiplex and amplifier part 408 which in turn is connected to the cabling 428 for the functions. The amplifier part 408 can contain electronics for serving temperature sensors, for example K-elements. In the same way as described above, the unit 400 also contains rules for a third protocol with adapter unit 419 and connectors 420 and 421 which are connected to the connection 422 using the protocol 423. A suitable protocol can be based on USB. The unit 400 can have a simple human interface in the form of light-emitting diodes 424, 424', etc., for indicating voltage supply, communication, diverse faults, etc.

A more complex unit can consist of the module such as 400 that is connected via a suitable connection, for example a USB connection, to a unit 450 with a microprocessor with peripherals specially adapted to handle communication and calculation problems. Such an arrangement has many advantages. The analog and strictly realtime-related problems are solved by the module 400, while the processor-intensive and less realtime-critical tasks are carried out by the unit 450. This unit is well-suited to request information which is available from the target system, both information according to CCP or a similar calibration protocol, and diagnostic information in accordance with ISO 15765 or a similar protocol, as these are created to be handled at a higher non-realtime-critical level. As far as construction is concerned, there is a great difference between the two units, which require different skills and experience on the part of the designers.

By means of the USB connection and the associated protocol, a well-defined interface is obtained between the modules which facilitates a parallel and largely independent development of the two units. In addition, the units can be manufactured as separate units, but can also be simply designed as one unit with an internal USB communication, either on one and the same PCB or as a sandwich construction. The module 450 is connected directly to one or several modules 400 by connectors that are shown by 451, 452, 451', 452', etc. Communication circuits 453, 453' are connected to a microprocessor 454 with associated peripherals, including memory or memories.

These memories contain application software, that is instructions for one or several applications that process information available to the microprocessor. A memory card 455 is arranged for logging, recording and playback facilities, etc. A memory 456 connected to the microprocessor can be written to and read from two (both) directions, that is from the system side and the tool side. The memory can be divided into a number of sub-memories with different algorithms 456', that are protected by passwords. The content can also be encrypted.

Verifications and signaling are protected by codes, passwords, etc. The function can comprise encryption according to PGP (Pretty Good Privacy). The clock 464 can be synchronized or coordinated with the clock 410 in the first unit via the protocol or by a separate clock-synchronization link. For examples of synchronization via protocols, refer to CanKingdom or TTCAN (ISO 11898-4). In this way, all first units connected to a second unit can be time-synchronized. In the same way, the second units can be time-synchronized with each other. By means of the time synchronization of the different units, the execution of the applications in the different units can be synchronized or related to each other temporally. In this way, execution of applications or application parts that correspond to measurements can be coordinated with execution of applications or application parts that are responsible for communication within and between the different units.

This means, among other things, that messages sent according to an event-driven protocol, for example CAN, can appear in a time-controlled way, as applications for the transmission of messages are executed with temporal coordination. As a result of the execution of applications for measurements being coordinated with the transmission of measurement results, a temporal relationship is obtained between the measurement and the distribution of the measurement result in the system in the form of messages. The same can, of course, apply for indicated events and messages with information concerning the respective event. Utilizing suitable software, the unit 450 can, together with the unit 400, simulate completely or partially an ECU in an ordinary CAN system in a vehicle. The unit 450 can be programmed for testing of various kinds. In the event of approval of the test, a device (lamp, bell, etc) 457 is activated.

If the equipment and the test function programmed therein receive a negative indication to the effect that the vehicle/car (the object) does not fulfill the requirements made of it, the device 458 is activated. The devices 457, 458 can consist of a device that operates with different colors, signals, etc, see above. The unit 450 can be equipped with devices for communication with other network protocols, for example Bluetooth 459 and TCP/IP 460 for communication between a network of units 450 and/or the tool unit implemented in the PC or PDA. As an alternative to disk storage, so-called USB memory sticks can be connected via a USB connection. For communication over a telecommunication network, the unit can be equipped with a GSM module 461 and for time synchronization or clock synchronization the unit can be equipped with a GPS module 462 which can also be used for position determination.

A random number generator 463 which generates random numbers for code functions, etc, is also connected to the microprocessor 454. See the above, regarding the protocol. The user can specify that what is to be sent is to go to special tools identified by ID, for example KVASER's ID, where KVASER provides the relevant ID. The equipment can be arranged to work with hardcoded serial numbers and ID to ensure that the correct pieces of equipment obtain the correct settings. For this purpose, there is a memory area that can be written to and read from the PC. Customer numbers can be utilized for the system and the PC.

Verifications and signatures are arranged to be carried out utilizing hardcoded keys. The PDA unit can be replaced by a simpler unit with the said functions for approval and non-approval, that is the unit has communication with the user that is even more limited than that of the PDA.

The powerful PC part can be consulted or can take over the testing in the event of a non-approved result. In one embodiment, the PDA unit can solve only known problems. Interactions can be carried out by data and/or voice.

Problems that are not resolved at PDA level are resolved at PC level and entered in the database, whereby the problem and its solution become known and can thereafter, for example, be included in those that can be resolved by the PDA or the unit in question. Signaling and verification can be carried out using asymmetric encryption, both between the PC and PDA and between the PDA and vehicles/cars (objects) in order to ensure that unauthorized manipulation of objects is made difficult and to ensure that it is possible to be able to trace later how the manipulation has been carried out. Hardcoded ID and digital signatures are thus utilized, in order to ensure that unauthorized or unintentional manipulation is prevented or made difficult and also to ensure that the manipulations that have been carried out can be traced and to ensure that different users of one and the same tool can be distinguished and can have access to different data and utilization options.

Traditionally, analog and digital measurements are separated from the communication in a network. In addition, the measurement system is divided into modules according to the type of measurement. A measurement unit can be constructed of a communication module, one or several temperature measurement modules, one or several analog modules, etc. The communication module is used for communicating measurement values. The modules 400 described in the invention have the capacity to carry out all types of measurement and to participate in the measurement object's network communication. Analog measurements can also be carried out on the network with the connector 426 via the cable 427 and correlated to messages appearing on the bus. In this way, one and the same module 400 can be used for input data for tools for both analysis of network communication and for analysis of physical events in a target system and also for simulation of modules.

Measurement values are normally presented as a function of time. In connection with a turbo, however, the measurement values are often required to be compared with the relevant state in the map associated with the compressor or turbine. This is particularly valuable during test running.

A unit 450 has the capacity to process the information so that the result can be presented as an operation point in a compressor or turbine map. The test driver can see on his PC or PDA in real time where the operation point in question lies in relation to the compressor map in question. By means of commands from his PDA, he can initiate logging of measurement values when the operation point lies in an area that is of interest for the development. The unit 450 can also be given trigger conditions for logging-data, so that this is only carried out at points of interest, which greatly reduces the memory required for logging and simplifies later analysis.

Other trigger conditions of interest can be set up, for example in the event of noises, high or low temperatures, etc. The unit 450 is particularly suitable for special programming as time-critical and complicated measurement is carried out by the unit 400, and the connection 422 that utilizes the protocol 423 constitutes an effective and well-defined interface between the two tasks.

Figure 5:
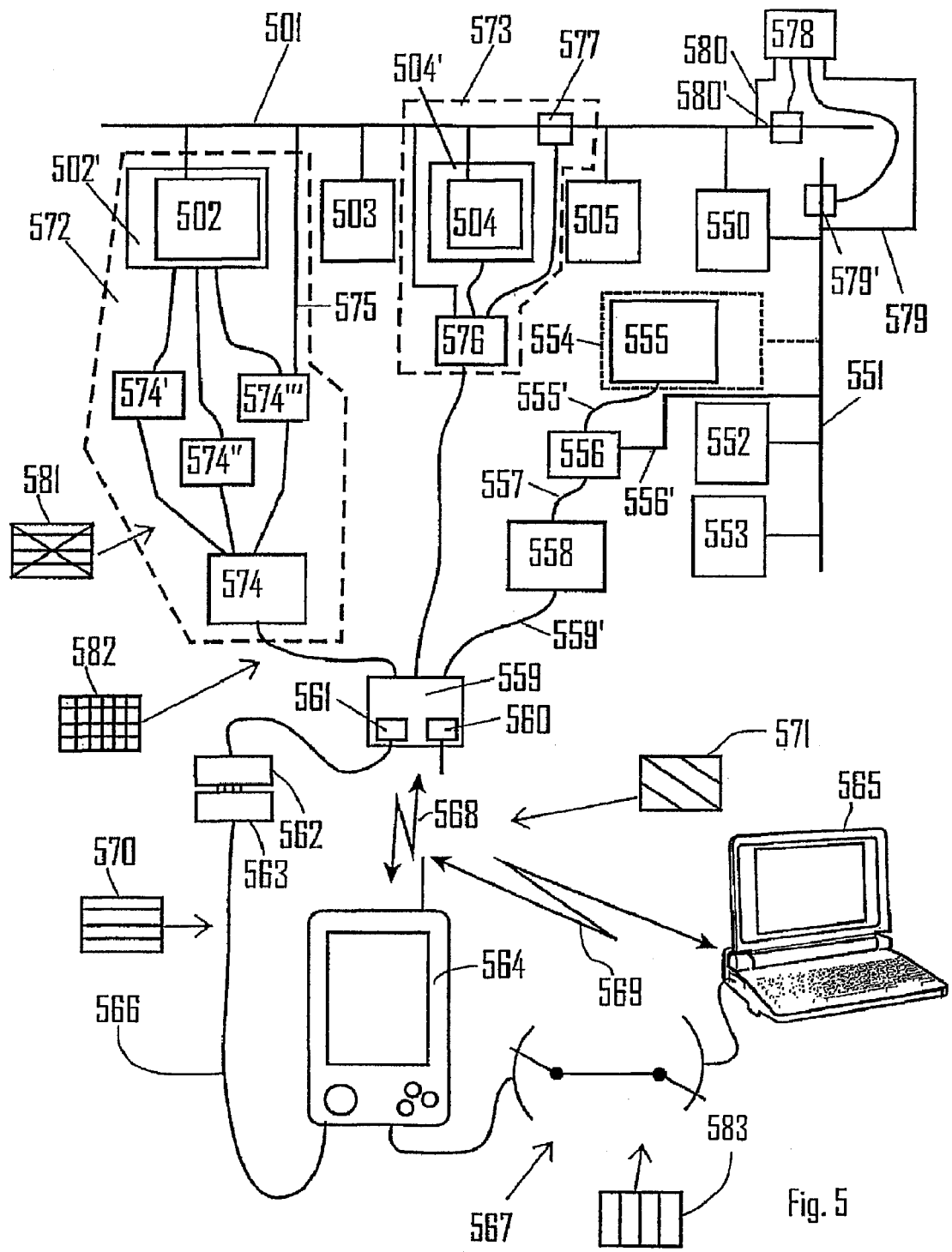
FIG. 5 shows in block diagram form, a measurement, analysis and simulation arrangement in a control system.

FIG. 5 shows schematically an example of a measurement arrangement.

The target system consists of two communication buses 501 and 551 that are connected via a gateway 550. A number of units 502, 503, 504 and 505, and 552 and 553 respectively are connected to the buses. The module 554 is to be developed to be included in the system and to be connected to the bus 551. The requisite input data is available in the unit 555, which is connected by the cabling 555' to the first unit 556 which corresponds to a measurement module 400. The first unit 556 is connected to the second unit 558, which corresponds to a module 450, via the USB connection 557, modified for time synchronization of the measurement system. The unit 556 is connected to the bus 551 by the connection 556'.

The units 556 and 558 together simulate the module 554 in the system. The unit 558 is connected to the system coordination unit 559 of the type 550 via the USB connection 559', which is also modified for time synchronization. The bit speed in the USB connections 557 and 559' can be different and the communication protocols are then considered to be different variants even though they differ only in bit speed. The system synchronization unit 559 can be connected to a tool in various ways.

Communication circuits for Bluetooth and USB (for example) are indicated by 560, 561. Connectors 562, 563 make possible the connection of a simplified tool part 564 (PDA) and a complex tool part 565, which parts can also be connected to the circuit 560 in the case of Bluetooth. The connections 566, 567, 568, 569 can be wired or wireless. A PDA 564 can thus have a wireless connection to the circuit 560 (see 568) and the part 565 (see 569). A protocol 570 can be based on USB and a protocol 571 is based on Bluetooth. A protocol 583 can be based on TCP/IP (Ethernet) for communication on the Internet (LAN) or on the World Wide Web.

The module 559 also coordinates the subsystems 572 and 573. The measurement subsystem 572 measures the object 502' for the network module 502. The measurement comprises three different parts in the object 502' that are served by the measurement modules 574', 574" and 574''' of the type 400, which in turn are connected to the coordination submodule 574 communicating using the protocol 581. The measurement module 574''' is connected to the system bus 501 via the connection 575. The measurement subsystem 572 can thereby not only coordinate the measurements with the bus traffic but can also leave information about it and analyze that information. The module 574 communicates with the coordination module 559 using the protocol 582. The measurement object 504' in the measurement subsystem 573 is served only by the measurement module 576 which is directly connected to the module 559.

The module 576 is also connected to the bus 501 and, in addition, is connected to it by the connection device 577 for the taking of measurements. The module 576 can thereby carry out detailed analog analyses of the message signals on the network. An additional variant of the use of modules of type 400 (or alternatively, 400+450) is shown by the module 578 which has an analog connection to the two buses by 579 and 580 respectively, and is connected for communication by 579' and 580' respectively. By means of this connection, a detailed analysis of both the digital and analog communication sequences can be carried out on the respective buses individually and in combination over the gateway 550.

The result of the analysis can be communicated over either bus to the measurement system or, in the alternative with the combined module 400+450, can be stored in the memory of the 450 part.

The unit 559 is thus the hub in a complex measurement and analysis system that can work independently or in combination with other units in a tool system. As each unit in the measurement system comprises one or several microprocessors, some optimized for measurement and analysis, specialized for certain tasks with stringent realtime requirements, others optimized for demanding calculation tasks and logging of results and data, a total measurement and analysis system is obtained which has a very large capacity but which can be configured and maintained in a simple way using high-level standard units adapted for communication with and presentation of results to people, such as a PC or PDA, directly or via a general communication system. Both problems relating to communication and problems relating to measurement can be analyzed and solved.

Solutions, tests, diagnostics and simulations can be input into the system and the system provides facilities for serving and being served in parallel by many people with different specialties in a reliable way. As described above, the various parts of the tool can communicate with each other using different protocols and protocol variants. Depending upon the nature of the task that the tool is to solve, different demands are made of the protocols.

In the parts that are close to the target system, real-time requirements and time-stamping of messages and events are important, for which reason protocol variants with time-synchronization characteristics are preferably used. For purely analytical tasks, realtime characteristics are less important, for which reason standard protocols are advantageously utilized as the basis.

If there is a need for wireless communication or communication over a general communication network, variants of commonly-used communication protocols are used, such as Bluetooth, TCP/IP, GSM, etc. By this means, it is attempted as far as possible to retain the organization and construction of signals and commands that are found in the protocol of the target system, and to break them up into their components as late as possible. For example, structures with SPNs and PGNs in a target system of the J1939 type are retained until the information is processed in the tool part residing in a PC or PDA.

Figure 6:
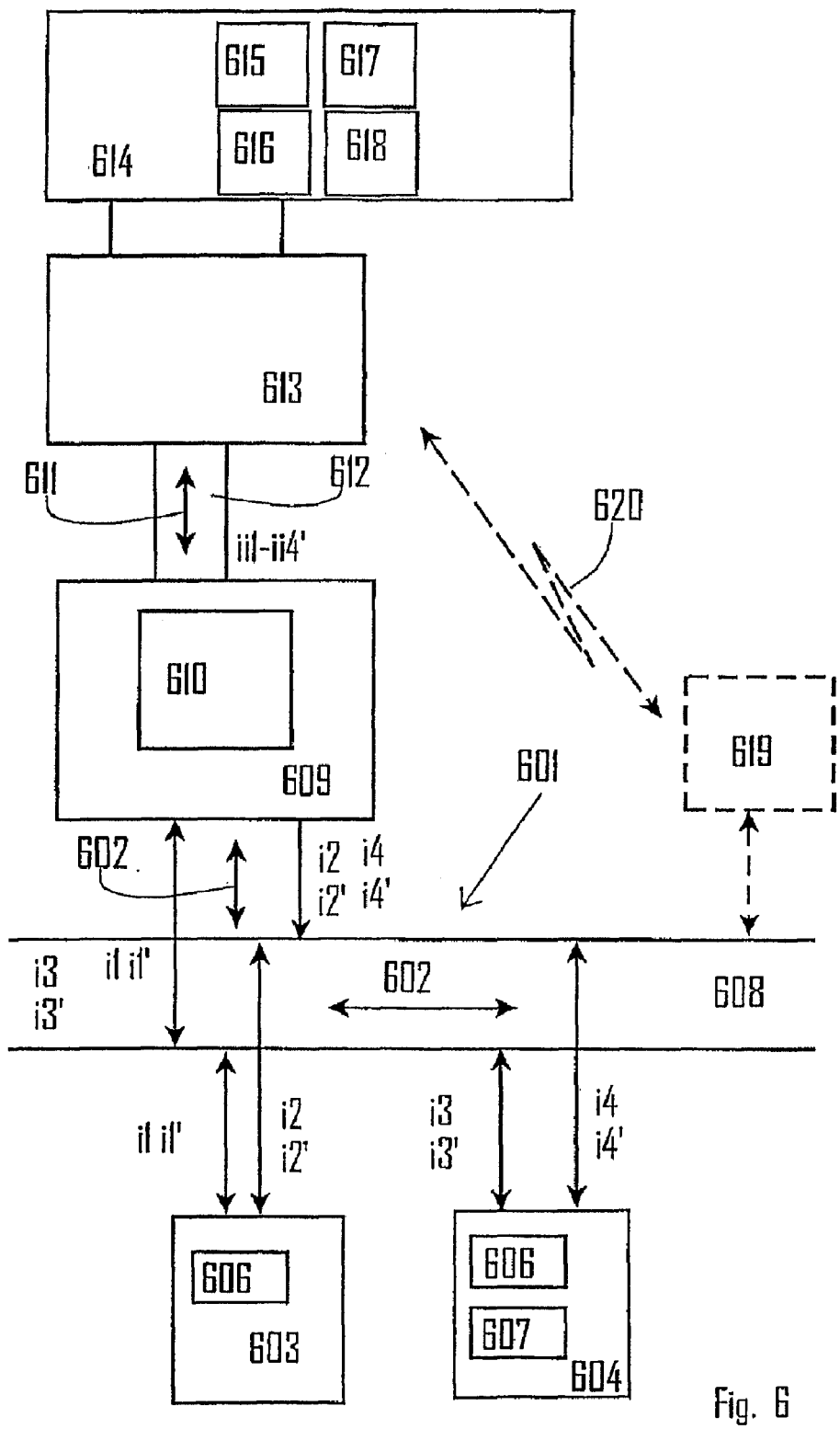
FIGS. 6 and 7 show in block diagram form, additional embodiments in relation to the embodiment according to FIGS. 1-5.

An additional embodiment is shown in FIG. 6. A distributed control system, measurement system or data collection system 601 works with a first protocol 602 and comprises a number of modules 603 and 604 for various tasks. For example, the module 603 is arranged to carry out temperature measurements using the sensor 606, while the module 604 can carry out several tasks 606,607, which can be selected by commands.

Commands i1, i3 and command responses i1', i3' and signals i2, i4 and signal responses i2', i4' are exchanged using the first protocol via the connection 608. A first unit 609, arranged for communication with the system and at least certain analysis of the same using the first protocol, is connected to the connection and can exchange signals and commands i1, i1', i2, i2', i3, i3' with a first structure and function arranged in accordance with the requirements of the system and the first protocol. The first unit comprises a conversion unit 610 that can convert signals and commands of a first structure and function according to the requirements of the first protocol and the system to a second structure and function adapted to a system, actual or virtual, working with a second protocol 611 with similar requirements. The converted signals and commands, marked in the figure by ii1-ii4', are transmitted completely or partially via the connection 612 to a second unit 613 arranged to work with the second protocol and to forward these in more or less processed form to the tool 614.

The tool 614 is arranged to work with the second protocol and the system, with properties such as scanning of messages 615, control functions 616, analysis functions 617 and structure functions 618. The described flow can take place in the opposite direction from the tool to the first system, with signals and command generated for the second system and protocol being sent via the second unit to the first unit where the signals and commands are converted to a structure and function according to the requirements of the first system and the first protocol.

The utilization of a second module 619 in the system as a gateway for the communication using a wireless connection 620 between the first unit and the tool is also within the concept of the invention. In a vehicle, a suitable such module can be a module for telephone communication between the vehicle and the general telecommunication network, or a module for statutory diagnostic information, so-called "OnBoard Diagnostics" (OBD), and a suitable second protocol can then be a standardized diagnostics protocol, for example a variant of KWP 2000 for CAN (ISO 15765). By variant of the protocol KWP is meant, for example, an implementation of the standard that is specific to a make of car. The unit (PDA or the like) or second part that can be connected to the computer or the first part (PC) is capable of carrying out some of the tasks that the PC can carry out.

These tasks are set up in the PC and downloaded to the PDA in configuration files. The PDA or like can consist of a standard unit that does not have the interface in question, for example a CAN interface. The PDA can be replaced by a simpler unit with indications, for example a lamp, lamps, signaling devices, etc, that indicate whether the system tested, simulated, etc, by the unit fulfils predetermined functions or specifications. The PDA or the unit has limited communication with the user and, in this way, simplified procedures can be utilized for testing or like. If the PDA (Personal Digital Assistant) or the unit emits a signal to the effect that the test or the like cannot be carried out, it can be connected to the more powerful PC that can download additional or other tasks to the PDA, for example after it has carried out analysis, simulation, etc, of the received information. The PDA or the like can also be disconnected from the PC by means of a special disconnection device (not shown) after the download and can be utilized for other systems than those shown. Several PDAs can be loaded from the PC and distributed to various technicians in the field.

Figure 7:
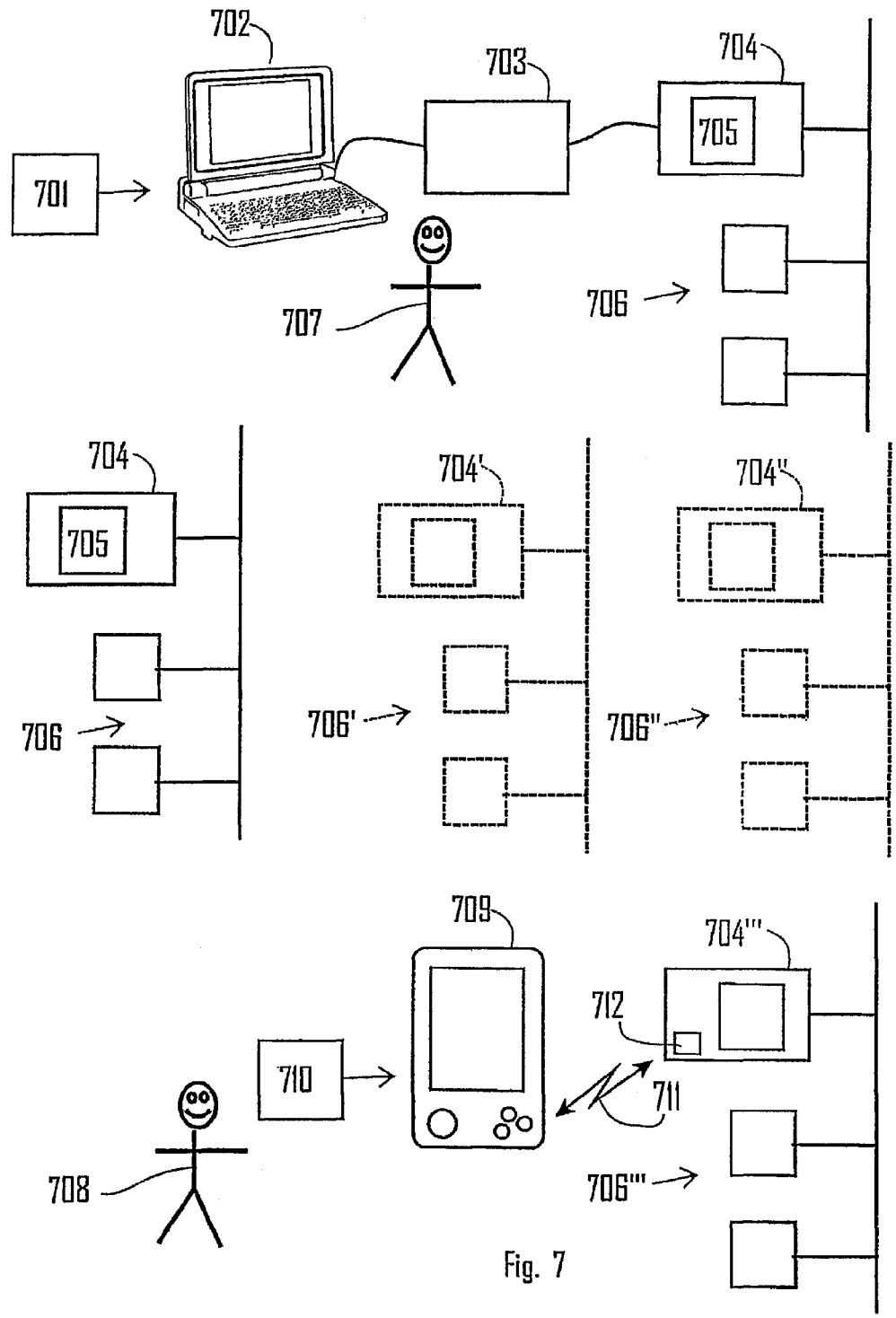

FIG. 7 shows a variant of the utilization of the invention. In a first stage, the tool 701 that is implemented on a PC 702, which is connected to a second unit 703 and a third unit 704, is equipped with an extended permanent memory and/or with a memory 705 that can be connected temporarily. The tool arrangement is connected to a system 706 and is connected up for direct analysis of the system, carried out by a human user 707. The user acquires experience of what it is important to check and verify in the system in order to ensure a reliable function. When this experience has been acquired, rules are generated for how the analysis can be repeated automatically in order for a correct diagnosis to be made, for example which messages are to be watched, sequences of messages on both sides of a given message with given content that are to be saved for further analysis, which messages are to be saved upon the appearance of error messages, active transmission of messages in given situations, etc.

These rules can be saved in the form of a data file that can be downloaded to the third unit 704. In addition, the user draws up rules for a partial database adapted for the PDA and rules for how collected information and the analysis result are to be presented in a PDA. These rules are compiled in one or several files that can be interpreted by a PDA with suitable software. These files can also be downloaded to the third unit.

In this first stage, the third unit 704 serves as an interface between the system and the other parts of the tool. In a second stage, the generated files are downloaded to one or several third units. This can be carried out directly by serial communication or via a temporary memory. Using instructions from these files, the third unit can then independently collect and process information that is important for the analysis and save this information in the extended memory. A large number of third units can thus be connected to an equally large number of systems, for example a fleet of vehicles, in a simple way. In this second stage, the third units function as complex data logs.

In a third stage, a technician 708 with a PDA 709 can connect this to a third unit 704''' that works for a period of time in the system 706'''. The PDA's software 710 starts by uploading, via a Bluetooth connection 711, the files that are stored in the third unit equipped with a Bluetooth interface 712, which files contain information about how the analysis is to be presented in the PDA, how the database is to be organized and how the continued analysis is to be carried out. In this way, a large number of technicians can analyze and diagnose a large number of systems in a rational way. In this third stage, the third units work together with the respective PDAs as a tailor-made analysis tool.

If a test or diagnosis fails, the technician 708 can, in a fourth stage, contact the user 707 who has expertise concerning the system, via a general means of communication. The user 707 can then utilize the technician 708 and bi-directional data transmission between the module 704''', the technician's PDA 709 and the tool in the PC 702 in order to analyze why the test or the diagnosis failed. By means of analyses and simulations, he can reach a correct diagnosis, carry out a standardized analysis in order to modify the diagnosis, save it in a databank and distribute it to the technician 708 and all his colleagues.

The invention is not restricted to the embodiments shown above as examples, but can be modified within the framework of the following patent claims and concept of the invention.

What is claimed as new and desired to be protected by Letters Patent of the United States is:

1. An apparatus comprising:
a processor device configured to communicate with an interface unit through a data connection using a first protocol, wherein the interface unit is configured to communicate with a distributed control system using a second protocol;
wherein the processor device is configured to provide simulated measurement signals configured to replace input data generated by at least one module configured to communicably connect to the distributed control system;
wherein the processor device is configured to provide control signals configured to replace control signals generated by at least one control device configured to communicably connect to the distributed control system and configured to operate at least one controlled object;
wherein the processor device is configured to send the simulated measurement signals and the control signals to the distributed control system using the second protocol via the interface unit, via the data connection using the first protocol.

2. The apparatus of claim 1, wherein the interface unit comprises a Global System for Mobile communications (GSM) module configured for communication over a telecommunication data network.

3. The apparatus of claim 1, wherein the first protocol comprises a variant of one of Personal Computer Memory Card International Association (PCMCIA), Transmission Control Protocol (TCP/IP), Universal Serial Bus (USB), or Bluetooth.

4. The apparatus of claim 1, wherein the second protocol comprises Controller Area Network (CAN).

5. The apparatus of claim 4, wherein the second protocol comprises a variant of one of Society of Automotive Engineers (SAE) standard J1939, Time Triggered CAN (TTCAN), or CAN Kingdom.

6. The apparatus of claim 4, wherein the processor device is configured to request a measurement signal and wherein the interface unit communicates the request by using CAN Calibration Protocol (CCP).

7. The apparatus of claim 1, wherein the processor device is further configured to analyze at least one physical state of at least one measurement object through the measurement signals generated by the at least one detector.

8. The apparatus of claim 7, wherein the processor device is further configured to generate programmatic instructions configured to cause a second processor device configured to run the programmatic instructions to store a subset of measurement signals generated by at least one detector in a log.

9. The apparatus of claim 8, wherein the processor device is further configured to receive a log generated by the second processor device and to evaluate the log as part of evaluating the response of the distributed control system to the simulated measurement signals.

10. The apparatus of claim 1, wherein the processor device further comprises a pass or fail status indicator configured to output a pass or fail status based on the response of the distributed control system to the simulated measurement signals.

11. The apparatus of claim 1, wherein the processor device is configured to generate at least one control signal in response to receiving the measurement signals generated by at least one detector and wherein the processor device is configured to send the at least one control signal to the distributed control system via the interface unit, through the data connection and the first protocol.

12. The apparatus of claim 1, wherein the processor device is further configured to generate programmatic instructions that define the simulated measurement signals.

13. The apparatus of claim 1, wherein the data connection is a wireless link.

14. The apparatus of claim 11, wherein the first protocol is Bluetooth.

15. A monitoring system comprising:
a plurality of monitoring units configured to communicate with at least one interface unit using a first protocol, wherein the at least one interface unit is communicably connected to a distributed control system, and the at least one interface unit is further configured to receive data values from the distributed control system using a second protocol;
wherein the plurality of monitoring units comprises at least one complex monitoring unit and at least one basic monitoring unit;
wherein the at least one complex monitoring unit is configured to receive a plurality of data values from the at least one interface unit using the first protocol and to generate programmatic instructions for the at least one basic monitoring unit;
wherein the at least one basic monitoring unit is configured to receive the programmatic instructions and in response thereto to receive a subset of the plurality of data values from the at least one interface unit using the first protocol.

16. The monitoring system of claim 15, wherein the plurality of monitoring units are further configured to receive data values from an associated detector and are further configured to analyze at least one physical state of at least one measurement object through the data values from the associated detector.

17. The monitoring system of claim 15, wherein the at least one basic monitoring unit is further configured to generate a log of the subset of the plurality of data values in response to the programmatic instructions.

18. The monitoring system of claim 15, wherein the complex monitoring unit is further configured to analyze logs from a plurality of basic monitoring units, wherein an individual log represents the subset of the plurality of data values received from a unique distributed control system.

19. The monitoring system of claim 15, wherein the programmatic instructions are configured to cause the basic monitoring unit to simulate an Electronic Control Unit (ECU) within the distributed control system.

20. The monitoring system of claim 19, wherein the programmatic instructions are further configured to cause the basic monitoring unit to evaluate performance of the distributed control system and to generate a log of a predetermined subset of the plurality of data values in response to predetermined aspects of the performance of the distributed control system.

21. The monitoring system of claim 15, wherein the plurality of monitoring units further comprise a wireless transmitter and receiver configured to communicate with the at least one interface unit using a wireless link.

22. The monitoring system of claim 21, wherein the first protocol is Bluetooth.

23. The monitoring system of claim 15, wherein the at least one complex monitoring unit is a Personal Computer (PC).

24. The monitoring system of claim 15, wherein the at least one basic monitoring unit is a personal digital assistant (PDA).

25. A method comprising:
receiving data values from a first distributed control system at a complex monitoring unit by connecting the complex monitoring unit through a first data connection using a first protocol to an interface unit connected to the first distributed control system, wherein the interface unit communicates with the first distributed control system using a second protocol through a second data connection;
analyzing the data values received from the first distributed control system at the complex monitoring unit to identify a subset of data values;
generating programmatic instructions using the complex monitoring unit, wherein the programmatic instructions will cause a basic monitoring unit running the programmatic instructions to collect a corresponding subset of data values in response to connecting to a second distributed control system having similar architecture as the first distributed control system.

26. The method of claim 25, further comprising:
applying the programmatic instructions to a basic monitoring unit configured to connect to the second distributed control system;
executing the programmatic instructions on the basic monitoring unit causing the basic monitoring unit to identify the corresponding subset of data values;
receiving the corresponding subset of data values from the second distributed control system at the basic monitoring unit, by connecting the basic monitoring unit through a first data connection using a first protocol to an interface unit connected to the second distributed control system, wherein the interface unit communicates with the distributed control system using a second protocol through a second data connection;
logging the corresponding subset of data values in the basic monitoring unit;
receiving the corresponding subset of data values from the basic monitoring unit at the complex monitoring unit.

27. The method of claim 26, wherein the logging occurs in response to receiving at least one of the corresponding subset of data values from the second distributed control system, wherein the at least one of the corresponding subset of data values indicates a preselected operation point specified by the programmatic instructions.

28. The method of claim 26 wherein the executing the programmatic instructions further causes the basic monitoring unit to simulate the performance of an Electronic Control Unit (ECU) connected to the second distributed control system and to evaluate the corresponding subset of data values to test the second distributed control system.

29. The method of claim 28 further comprising in response to determining with the basic control unit that the second distributed control system failed the test, evaluating the second distributed control system with the complex monitoring unit by connecting the complex monitoring unit to the second distributed control system to identify a reason that the second distributed control system failed the test.

* * * * *

UNITED STATES PATENT AND TRADEMARK OFFICE
CERTIFICATE OF CORRECTION

| | | |
|---|---|---|
| PATENT NO. | : 7,987,002 B2 | Page 1 of 1 |
| APPLICATION NO. | : 11/420684 | |
| DATED | : July 26, 2011 | |
| INVENTOR(S) | : Fredriksson | |

It is certified that error appears in the above-identified patent and that said Letters Patent is hereby corrected as shown below:

Title Page, item (57), under "Abstract", in Column 2, Line 18, delete "van" and insert -- can --.

Column 18, line 16, in Claim 28, delete "claim 26" and insert -- claim 26, --.

Column 18, line 22, in Claim 29, delete "claim 28" and insert -- claim 28, --.

Signed and Sealed this

Thirteenth Day of March, 2012

David J. Kappos
*Director of the United States Patent and Trademark Office*